United States Patent
Kamoto et al.

(10) Patent No.: US 6,546,719 B2
(45) Date of Patent: Apr. 15, 2003

(54) AIR-FUEL RATIO CONTROL APPARATUS OF INTERNAL COMBUSTION ENGINE

(75) Inventors: Akira Kamoto, Susono (JP); Toshinari Nagai, Shizuoka (JP); Akihiro Katayama, Susono (JP); Naoto Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/956,992

(22) Filed: Sep. 21, 2001

(65) Prior Publication Data

US 2002/0040577 A1 Apr. 11, 2002

(30) Foreign Application Priority Data

Oct. 6, 2000 (JP) .......................................... 2000-307995

(51) Int. Cl.[7] ................................................. F01N 3/00
(52) U.S. Cl. .......................................... 60/285; 60/276
(58) Field of Search .......................... 60/274, 276, 285, 60/277; 73/23.31, 23.32, 118.2

(56) References Cited

U.S. PATENT DOCUMENTS

| 5,293,740 A | * | 3/1994 | Heppner et al. ............... 60/285 |
| 5,656,765 A | * | 8/1997 | Gray ........................... 60/276 |
| 5,678,402 A | * | 10/1997 | Kitagawa et al. ............. 60/285 |
| 5,842,339 A | * | 12/1998 | Bush et al. ................... 60/274 |
| 5,842,340 A | * | 12/1998 | Bush et al. ................... 60/285 |
| 5,901,552 A | * | 5/1999 | Schnaibel et al. ............ 60/285 |
| 6,282,889 B1 | * | 9/2001 | Kakuyama et al. ........... 60/285 |

FOREIGN PATENT DOCUMENTS

| JP | A 5-195842 | 8/1993 |
| JP | A 9-72235 | 3/1997 |

* cited by examiner

Primary Examiner—Thomas Denion
Assistant Examiner—Tu M. Nguyen
(74) Attorney, Agent, or Firm—Oliff & Berridge, PLC

(57) ABSTRACT

An air-fuel ratio control apparatus of an internal combustion engine according to the present invention is provided with an oxygen storage amount estimator for estimating an oxygen storage amount of an exhaust purifying catalyst and air-fuel ratio control means for controlling an air-fuel ratio, based on the oxygen storage amount. An upper threshold and a lower threshold are set for the oxygen storage amount, and the air-fuel ratio controller performs such control that, when the oxygen storage amount is larger than the upper threshold, the controller controls the air-fuel ratio to a rich region and that, when the oxygen storage amount is smaller than the lower threshold, the controller controls the air-fuel ratio to a lean region. Since this control makes the oxygen storage amount vary between the upper threshold and the lower threshold (within a predetermined range), it is feasible to promote activation of the exhaust purifying catalyst, so as to keep purification performance of the exhaust purifying catalyst high, and to implement stable control of air-fuel ratio.

10 Claims, 4 Drawing Sheets

AIR-FUEL RATIO CONTROL APPARATUS OF INTERNAL COMBUSTION ENGINE

BACKGROUND OF THE INVENTION

1. Field of the Invention

The present invention relates to air-fuel ratio control apparatus of internal combustion engine.

2. Related Background Art

For purifying exhaust gas from the internal combustion engine, an exhaust purifying catalyst (three-way catalyst) is placed on the exhaust path, an air-fuel ratio sensor is located on the exhaust path to detect the air-fuel ratio (A/F), and feedback control is implemented so as to control an air-fuel mixture toward the stoichiometric air-fuel ratio, thereby simultaneously decreasing nitrogen oxides (NOx), carbon monoxide (CO), and hydrocarbons (HC). The purification efficiency of exhaust gas emitted from the internal combustion engine is further increased effectively by carrying out the foregoing feedback control with accuracy. It is also effective to enhance the purification efficiency of nitrogen oxides NOx, carbon monoxide CO, and hydrocarbons HC by the oxygen occlusion function of the exhaust purifying catalyst.

Research has been conducted heretofore on control for making effective use of this oxygen occlusion function. A control apparatus noting the oxygen occlusion function is, for example, one described in Japanese Patent Application Laid-Open No. H05-195842. The control apparatus described in No. H05-195842 is configured to determine one target value as an amount of oxygen (oxygen storage amount) to be stored in the exhaust purifying catalyst and always control air-fuel ratios so that the oxygen storage amount becomes this target value.

SUMMARY OF THE INVENTION

The exhaust purifying catalyst possesses such a property that, when the catalyst is subjected to repetitions of oxidation/reduction reactions and oxygen adsorption/desorption reactions to some extent, catalyst metal is activated more and the purification performance (oxidation/reduction performance, oxygen adsorption/desorption performance) is maintained higher than otherwise. If the control to converge the oxygen storage amount on one target value is always kept on, there will occur a phenomenon in which the activation of catalyst metal is hindered, so as to degrade the exhaust purification performance. There were thus desires for improvement to overcome this problem.

Accordingly, an object of the present invention is to provide air-fuel ratio control apparatus of internal combustion engine that can suppress the degradation of the oxygen occlusion capability of the exhaust purifying catalyst and that can perform stable control of air-fuel ratio.

An air-fuel ratio control apparatus of an internal combustion engine according to the present invention comprises oxygen storage amount estimating means for estimating an oxygen storage amount of an exhaust purifying catalyst located on an exhaust path of the internal combustion engine, based on a history of an oxygen adsorption/desorption amount calculated from an air-fuel ratio of the internal combustion engine, and air-fuel ratio control means for controlling the air-fuel ratio, based on the oxygen storage amount estimated by the oxygen storage amount estimating means. An upper threshold and a lower threshold are set for the oxygen storage amount estimated by the oxygen storage amount estimating means. When the oxygen storage amount estimated by the oxygen storage amount estimating means is between the upper threshold and the lower threshold, the air-fuel ratio control means controls the air-fuel ratio to a constant value. When the oxygen storage amount estimated is larger than the upper threshold, the air-fuel ratio control means controls the air-fuel ratio to a rich region. When the oxygen storage amount estimated is smaller than the lower threshold, the control means controls the air-fuel ratio to a lean region. Therefore, according to the present invention, the oxygen storage amount varies between the upper threshold and the lower threshold (within a predetermined range) and it is thus feasible to promote the activation of the exhaust purifying catalyst, so as to keep the purification performance of the exhaust purifying catalyst high and to implement stable control of air-fuel ratio.

In a preferable aspect of the invention, a target storage amount is further set between the upper threshold and the lower threshold, and the air-fuel ratio control means performs such control that, when the oxygen storage amount estimated by the oxygen storage amount estimating means is larger than the upper threshold, the air-fuel ratio control means controls the air-fuel ratio to the rich region so that the oxygen storage amount becomes the target storage amount and that, when the oxygen storage amount estimated is smaller than the lower threshold, the air-fuel ratio control means controls the air-fuel ratio to the lean region so that the oxygen storage amount becomes the target storage amount. This makes it feasible to implement both keeping the oxygen storage amount within the predetermined range and also effecting the variation thereof.

In a further preferable aspect of the invention, two target storage amounts are set as an upper target storage amount and a lower target storage amount between the upper threshold and the lower threshold, and the air-fuel ratio control means performs such control that, when the oxygen storage amount estimated by the oxygen storage amount estimating means is larger than the upper threshold, the air-fuel ratio control means controls the air-fuel ratio to the rich region so that the oxygen storage amount becomes the upper target storage amount and that, when the oxygen storage amount estimated is smaller than the lower threshold, the air-fuel ratio control means controls the air-fuel ratio to the lean region so that the oxygen storage amount becomes the lower target storage amount. This further decreases chances of forcibly controlling the oxygen storage amount by the air-fuel ratio control based on the oxygen storage amount and can promote the activation of the exhaust purifying catalyst further more.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Prior to the detailed description of an embodiment, the oxygen occlusion function of exhaust purifying catalyst will be described briefly.

Figure 1:
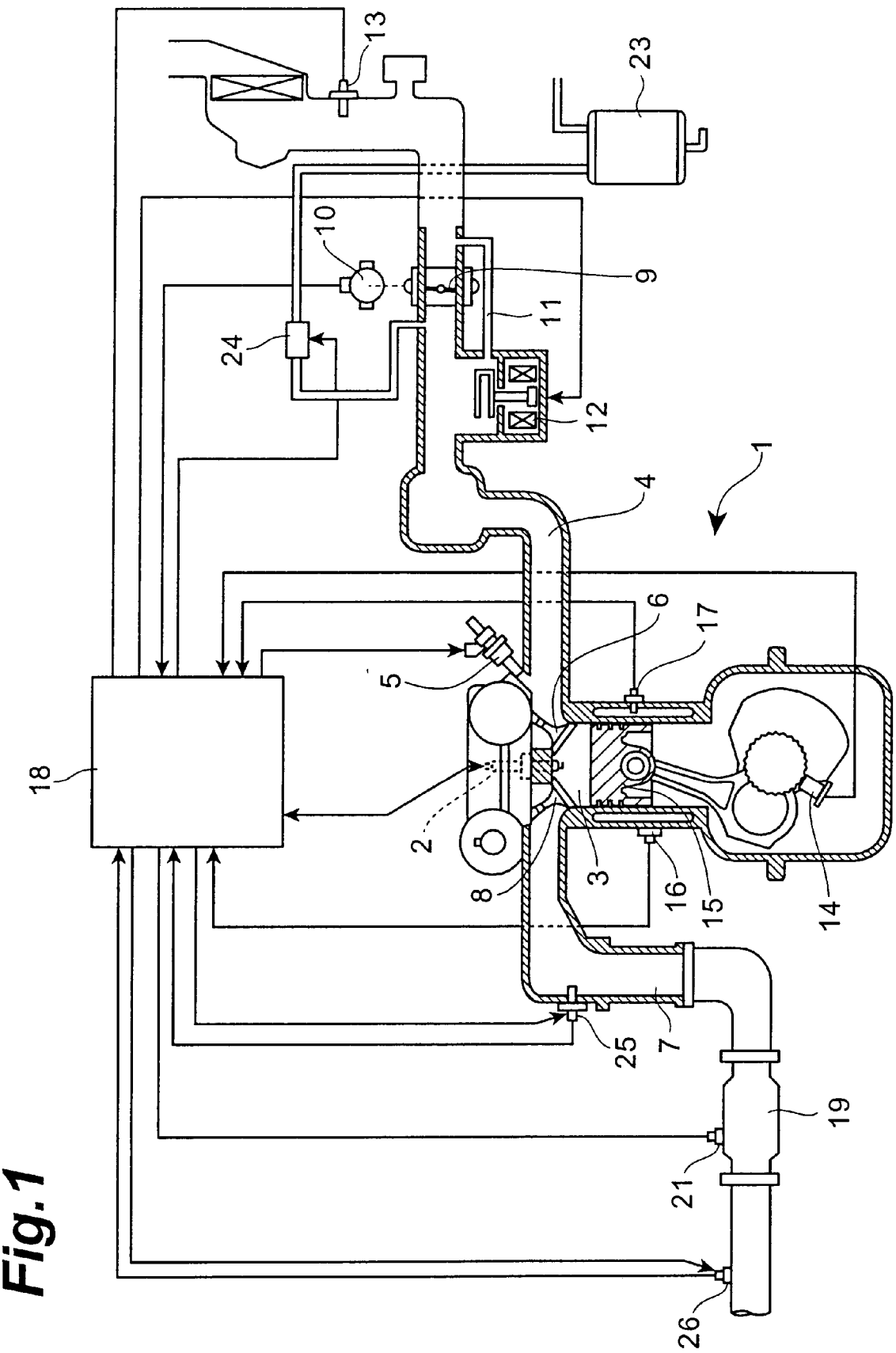
FIG. 1 is a cross-sectional view of an internal combustion engine having an embodiment of the control apparatus of the present invention.

In the embodiment described below, as shown in FIG. 1, an exhaust purifying catalyst 19 is located on an exhaust path 7. In some types of cars a plurality of exhaust purifying catalysts are provided on the exhaust path. Exhaust purifying catalysts are positioned in series or positioned in a row on branched exhaust pipes. For example, for an engine with four cylinders, an exhaust purifying catalyst is located at the position where exhaust pipes of two cylinders out of the four cylinders are combined into one and another exhaust purifying catalyst is located at the position where exhaust pipes of the two rest cylinders are combined into one. In the present embodiment, one exhaust purifying catalyst 19 is provided downstream of the position where the exhaust pipes of the respective cylinders 3 are combined into one.

In the following embodiment the exhaust purifying catalyst 19 is a three way catalyst having the oxygen occlusion function. This three way catalyst contains the component of ceria ($CeO_2$) and so on. For the sake of these component, it can occlude (adsorb) oxygen from the exhaust gas, and also can release oxygen into the exhaust gas.

This function of the three-way catalyst is the function of adsorbing and retaining excess oxygen existing in the exhaust gas at lean air-fuel ratios but releasing the thus adsorbed and retained oxygen at rich air-fuel ratios. During lean mixture periods the three-way catalyst adsorbs excess oxygen to reduce nitrogen oxides NOx; whereas during rich mixture periods the oxygen adsorbed in the three-way catalyst is released to oxidize CO and HC. In consequence, NOx, CO, and HC all are purified.

At this time, as described previously, if the three way catalyst occludes oxygen up to the limit of its oxygen occlusion capacity, it will be unable to occlude any more oxygen when the exhaust A/F turns lean, and the catalyst will fail to satisfactorily purify NOx in the exhaust gas. On the other hand, if the three-way catalyst completely releases oxygen so as to store no oxygen at all, it will be unable to release any more oxygen when the exhaust A/F turns rich, and it will fail to satisfactorily purify CO and HC in the exhaust gas. For this reason, the oxygen storage amount is controlled so as to be ready for any situation wherein the exhaust air-fuel ratio of input gas turns either lean or rich.

Since the three way catalyst occludes or releases oxygen according to the exhaust air-fuel ratio as described above, the oxygen storage amount can be controlled by controlling the air-fuel ratio (A/F). In the normal A/F control, a basic injected fuel quantity is calculated based on an intake air volume and others, and a final injected fuel quantity is determined by multiplying the basic injected fuel quantity by various correction factors (or by adding the correction factors thereto). In the present embodiment, a correction factor based on the oxygen storage amount is determined for control of the oxygen storage amount, and the A/F control based on the oxygen storage amount is carried out using it.

As detailed later, there are situations wherein "the A/F control based on the oxygen storage amount" is not carried out. In such situations the A/F control itself can be implemented. The situations wherein "the A/F control based on the oxygen storage amount" is not carried out, include, for instance, a case wherein the aforementioned correction factor based on the oxygen storage amount is not calculated, and a case wherein the correction factor based on the oxygen storage amount is calculated but is not reflected in the actual A/F control.

The embodiment of A/F control apparatus according to the present invention will be described below. FIG. 1 shows an internal combustion engine equipped with the embodiment of A/F control apparatus.

The control apparatus of the present embodiment controls the engine (internal combustion engine) 1. The engine 1 generates driving force by igniting the air-fuel mixture gas in each cylinder 3 by an ignition plug 2, as shown in FIG. 1. During combustion in the engine 1, air charged from the outside is guided through an intake path 4, and mixed with fuel injected from injector 5. Then air-fuel mixture gas is charged into each cylinder 3. An intake valve 6 opens or closes between the interior of each cylinder 3 and the intake path 4. The mixture after burnt inside each cylinder 3 is discharged as exhaust gas into the exhaust path 7. An exhaust valve 8 opens or closes between the interior of each cylinder 3 and the exhaust path 7.

A throttle valve 9 for controlling the intake air volume charged into the cylinders 3 is provided on the intake path 4. A throttle position sensor 10 for detecting a throttle angle of the throttle valve 9 is connected to the throttle valve 9. An air bypass valve 12 for adjusting the intake air volume of air supplied through a bypass line 11 into the cylinders 3 during idling (in a fully closed state of the throttle valve 9) is also provided on the intake path 4. Further, an air flow meter 13 for detecting the intake air flow is also mounted on the intake path 4.

A crank position sensor 14 for detecting the position of the crank shaft is mounted in the vicinity of the crank shaft of the engine 1. It is also feasible to determine the position of piston 15 in each cylinder 3 and the engine speed NE from output of the crank position sensor 14. The engine 1 is also provided with a knock sensor 16 for detecting knocking of the engine 1 and a water temperature sensor 17 for detecting the temperature of cooling water.

These ignition plugs 2, injectors 5, throttle position sensor 10, air bypass valve 12, air flow meter 13, crank position sensor 14, knock sensor 16, water temperature sensor 17, and other sensors are connected to an electronic control unit (ECU) 18 for totally controlling the engine 1, and are controlled based on signals from the ECU 18, or send their detection result to the ECU 18. Also connected to the ECU 18 are a catalyst temperature sensor 21 for measuring the temperature of the exhaust purifying catalyst 19 disposed on the exhaust path 7 and a purge control valve 24 for purging evaporative fuel from the interior of the fuel tank, collected by a charcoal canister 23, onto the intake path 4.

Also connected to the ECU 18 are an upstream A/F sensor 25 mounted upstream of the exhaust purifying catalyst 19 and a downstream A/F sensor 26 mounted downstream of the catalyst 19. The upstream A/F sensor 25 is a linear A/F sensor for linearly detecting the exhaust A/F from the oxygen content in the exhaust gas at the mount position. The downstream A/F sensor 26 is an oxygen sensor for detecting the exhaust A/F on an on-off basis from the oxygen content in the exhaust gas at the mount position. Since these A/F sensors 25, 26 cannot perform accurate detection below a predetermined temperature (activation temperature), they are heated by electrical power supplied via the ECU 18 so as to increase the temperature thereof to the activation temperature in the early stage.

The ECU 18 incorporates a CPU for execution of arithmetics, RAM(s) for saving various information contents such as results of arithmetics and others, backup RAM(s) contents of which are retained by a battery, ROM(s) for storing respective control programs, and so on. The ECU 18 controls the engine 1, based on A/F, and calculates the storage amount of oxygen occluded in the exhaust purifying catalyst 19. The ECU 18 also calculates the injection quantity of fuel injected from the injectors 5 and determines deterioration of the exhaust purifying catalyst 19 from the history of oxygen storage amount. Namely, the ECU 18 controls the engine 1, e.g., based on the exhaust A/F detected and the oxygen storage amount calculated.

Described below is the control executed by the above-stated A/F control apparatus wherein the oxygen storage amount of the exhaust purifying catalyst 19 is estimated using a history of oxygen adsorption/desorption amounts and A/F (air-fuel ratio) feedback control is carried out (or the case of halting control) the based on the estimated oxygen storage amount.

The oxygen storage amount O2SUM is gained by estimating the oxygen A/D (adsorption/desorption) amount O2AD of the exhaust purifying catalyst 19 from the exhaust air-fuel ratio (A/F) upstream of the exhaust purifying catalyst 19, detected by the upstream A/F sensor 25, and integrating it (i.e., by using a history thereof). In this embodiment, when the oxygen A/D amount O2AD is positive, oxygen is occluded into the exhaust purifying catalyst 19, i.e., the oxygen storage amount O2SUM increases. On the other hand, when the oxygen A/D amount O2AD is negative, oxygen is released, i.e., the oxygen storage amount O2SUM decreases.

Figure 3:
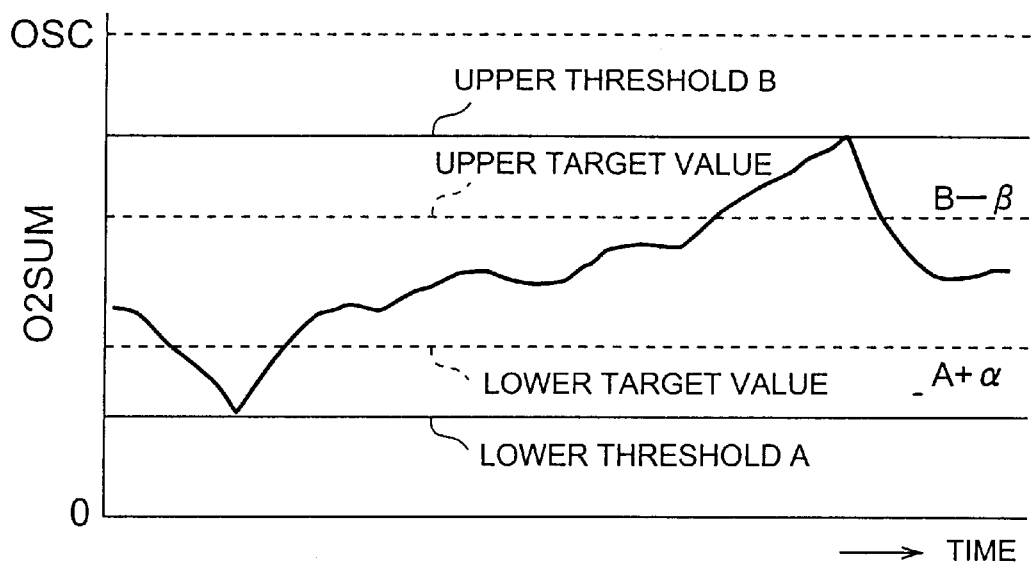
FIG. 3 is a graph showing variation of oxygen storage amount during control according to an embodiment of the control apparatus of the present invention.

A maximum occludable oxygen amount OSC is defined as a maximum oxygen storage amount of oxygen that the exhaust purifying catalyst 19 can occlude (cf. FIG. 3). Namely, the oxygen storage amount O2SUM takes values between zero and the maximum occludable oxygen amount OSC. The oxygen storage amount O2SUM being zero means that the exhaust purifying catalyst 19 stores no oxygen, and the oxygen storage amount O2SUM being the maximum occludable oxygen amount OSC means that the exhaust purifying catalyst 19 stores oxygen up to the limit of its capability. The maximum occludable oxygen amount OSC is not constant, but may vary depending upon states of the exhaust purifying catalyst 19 (temperatures, deterioration levels, etc.). The maximum occludable oxygen amount OSC is updated based on the result of detection by the downstream A/F sensor 26.

Figure 4:
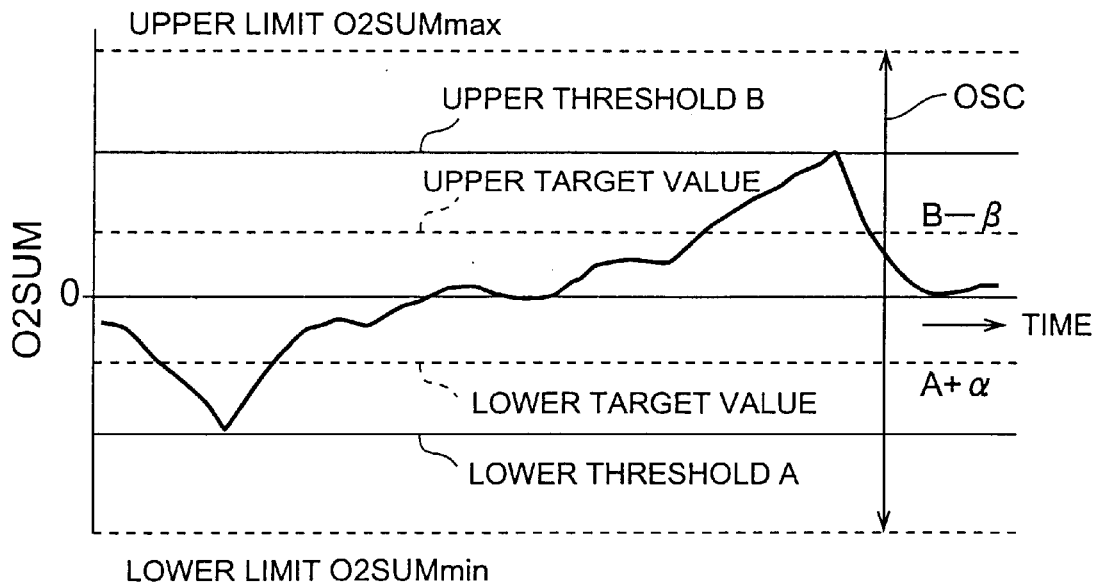
FIG. 4 is a graph showing variation of oxygen storage amount during control according to another embodiment of the control apparatus of the present invention.

The oxygen storage amount O2SUM can also be calculated with respect to a reference at a certain point of time (e.g., at the time of activation of ignition). In this case, the apparatus may be configured to define the oxygen storage amount O2SUM at the reference time as zero and perform control to vary the oxygen storage amount O2SUM on the upper and lower sides of zero. In this configuration, an upper limit O2SUMmax and a lower limit O2SUMmin can be set, and a difference between the upper and lower limits (O2SUMmax−O2SUMmin) is equivalent to the foregoing maximum occludable oxygen amount OSC (cf. FIG. 4). The foregoing upper limit O2SUMmax and lower limit O2SUMmin can vary each according to states of the exhaust purifying catalyst 19. These upper limit O2SUMmax and lower limit O2SUMmin (i.e., O2SUMmax−O2SUMmin= maximum occludable oxygen amount OSC) are updated based on the result of detection by the downstream A/F sensor 26.

In the present embodiment, the upstream A/F sensor 25 and ECU 18 function as the oxygen storage amount estimating means for estimating the oxygen storage amount O2SUM from the history of the oxygen A/D amount O2AD. The ECU 18, air flow meter 13, and injectors 5 function as the air-fuel ratio control means.

Figure 2:
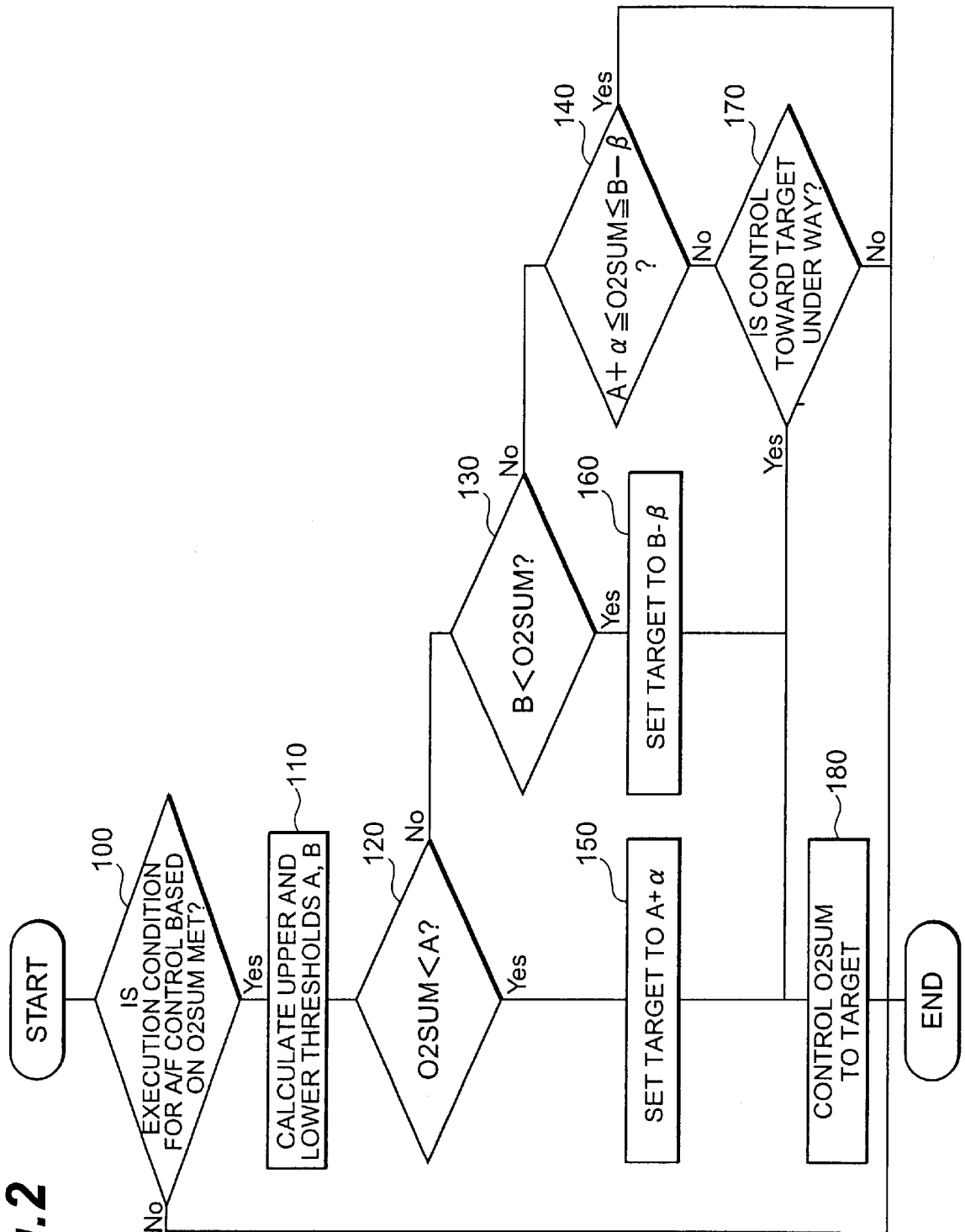
FIG. 2 is a flowchart of control according to an embodiment of the control apparatus of the present invention.

FIG. 2 shows a flowchart of the control in the present embodiment. And FIG. 3 shows change of the oxygen storage amount O2SUM with a lapse of time. In the control of the present embodiment, as shown in FIG. 3, an upper threshold B and a lower threshold A are set for the oxygen storage amount O2SUM estimated. Two target storage amounts are further set between the upper threshold B and the lower threshold A. These two target storage amounts are an upper target storage amount B−β set near the upper threshold B and a lower target storage amount A+α set near the lower threshold A.

These lower threshold A, upper threshold B, lower target storage amount A+α, and upper target storage amount B−β may be either fixed values or variable values. In the present embodiment, they are varied according to states of the exhaust purifying catalyst 19. Within the time range shown in FIG. 3, the maximum occludable oxygen amount OSC is constant.

When the oxygen storage amount O2SUM becomes larger than the upper threshold B, the air-fuel ratio is controlled to the rich region (i.e., the oxygen storage amount O2SUM is decreased) until the oxygen storage amount O2SUM becomes the upper target storage amount B−β. On the other hand, when the oxygen storage amount O2SUM becomes smaller than the lower threshold A, the air-fuel ratio is controlled to the lean region (i.e., the oxygen storage amount O2SUM is increased) until the oxygen storage amount O2SUM becomes the lower target storage amount A+α. When the oxygen storage amount O2SUM is between the upper threshold B and the lower threshold A, the air-fuel ratio is controlled to a constant value.

"The situation wherein the oxygen storage amount O2SUM is between the upper threshold B and the lower threshold A", stated herein, refers to a case wherein the oxygen storage amount O2SUM is within this range from the beginning. Namely, the expression excludes a case wherein the oxygen storage amount O2SUM stays within the above range during a process after the oxygen storage amount O2SUM became greater than the upper threshold B, the oxygen storage amount O2SUM is being controlled toward the upper target storage amount B−β. And the expression also excludes a case wherein the oxygen storage amount O2SUM stays within the above range during a process after the oxygen storage amount O2SUM became smaller than the lower threshold A, the oxygen storage amount O2SUM is being controlled toward the lower target storage amount A+α.

For the control to keep the air-fuel ratio constant in the case of the oxygen storage amount O2SUM being between the upper threshold B and the lower threshold A, feedback control to the stoichiometric air-fuel ratio is executed in the present embodiment. This is common control to lead the air-fuel ratio to the stoichiometric air-fuel ratio, based on the exhaust air-fuel ratios detected by the A/F sensors 25, 26. Although the air-fuel ratio is controlled to the constant value herein as described above, there can occur such phenomena in practice that the air-fuel ratio is varied with intention by injected fuel quantity correcting control, e.g., increase of fuel during acceleration or fuel cutting during deceleration, and that an inevitable change of air volume, a control error of injected fuel quantity, and so on cause inevitable variation of the air-fuel ratio, so as to result in deviation of the air-fuel ratio from the stoichiometric air-fuel ratio.

As a consequence of these phenomena, the oxygen storage amount O2SUM can vary depending upon the development (outgrowth) of situation according to change of driving conditions even if the air-fuel ratio is controlled so as to be constant while the oxygen storage amount O2SUM stays within the aforementioned range. As described previously, the exhaust purifying catalyst possesses the property that the catalyst metal is activated more and the purification performance (oxidation/reduction performance and oxygen A/D performance) is kept higher when it is subjected to repetitions of oxidation and reduction reactions and the oxygen adsorption/desorption reactions to some extent, i.e., when the oxygen storage amount O2SUM is varied to some extent. For this reason, when the oxygen storage amount O2SUM is naturally varied within the predetermined range in this way, the catalyst metal is activated, so as to be able to keep the exhaust purification performance high.

Figure 5:
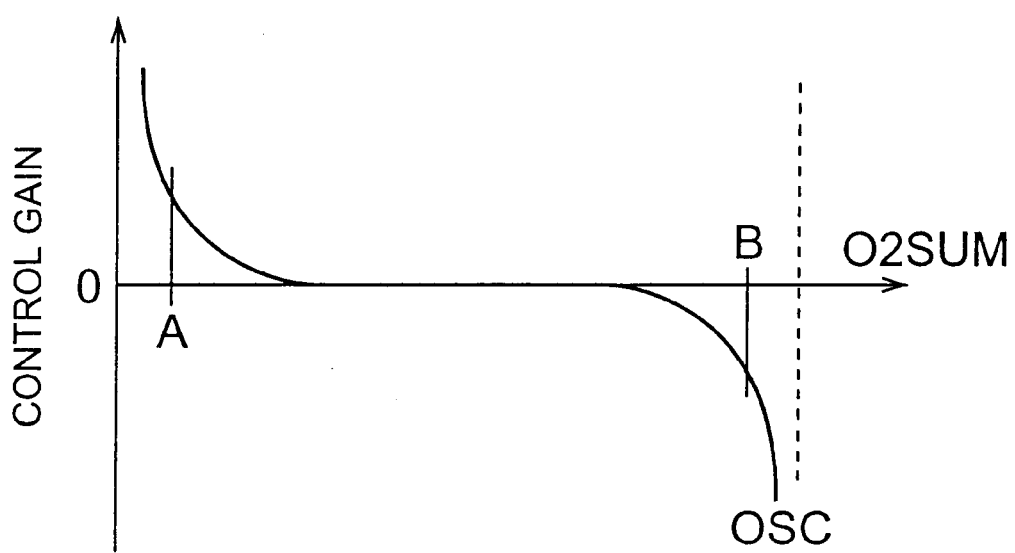
FIG. 5 is a graph showing a relation between control gain and oxygen storage amount during control according to an embodiment of the control apparatus of the present invention.

Further, a relation between oxygen storage amount O2SUM and control gain in the A/F control is presented in FIG. 5. By increasing the absolute value of control gain with increase in estrangement from the predetermined range of the oxygen storage amount O2SUM as shown in this figure, it is feasible to return the oxygen storage amount O2SUM to within the predetermined range earlier. In the case of the oxygen storage amount O2SUM being within the predetermined range, it is feasible to suppress fluctuations of the control system, by setting the absolute value of control gain small. It is noted that the control gain shown in FIG. 5 includes only the control gain of the part associated with the oxygen storage amount O2SUM. In practice, the control is affected by the overall control gain in which control gains of other controls (normal A/F feedback control etc.) are superimposed thereon.

The control in the present embodiment will be described below on the basis of the flowchart shown in FIG. 2. The first step is a step of determining whether the system is in such a basic situation that the A/F control based on the oxygen storage amount O2SUM is allowed (i.e., whether a control execution condition is met) (step 100). The control execution condition is, for example, whether the upstream A/F sensor 25 has reached the activation temperature. Since the oxygen storage amount O2SUM is estimated based on the output of the upstream A/F sensor 25 as described above, the normal estimation of the oxygen storage amount O2SUM cannot be implemented unless the upstream A/F sensor 25 is activated. Under this situation, it is assumed that the control execution condition is not met.

When step 100 results in no, the A/F control based on the oxygen storage amount O2SUM is not carried out and the control of the flowchart shown in FIG. 2 is halted. When step 100 results in yes, the upper threshold B and the lower threshold A are then calculated and set, based on the status of the exhaust purifying catalyst 19 or the like (step 110). The next step is a step of determining whether the oxygen storage amount O2SUM at that time is smaller than the lower threshold A (step 120). When step 120 results in yes, i.e., when the oxygen storage amount O2SUM is smaller than the lower threshold A and outside the predetermined range, the lower target storage amount A+α is set as a target storage amount of the oxygen storage amount O2SUM in order to return the oxygen storage amount O2SUM to within the predetermined range (step 150). After step 150, control is executed to converge the oxygen storage amount O2SUM on the set target storage amount (step 180).

When step 120 results in no on the other hand, it is then determined whether the oxygen storage amount O2SUM is larger than the set upper threshold B (step 130). When step 130 results in yes, i.e., when the oxygen storage amount O2SUM is larger than the upper threshold B and outside the predetermined range, the upper target storage amount B−β is set as a target storage amount of the oxygen storage amount O2SUM in order to return the oxygen storage amount O2SUM to within the predetermined range (step 160). After step 160, control is executed to converge the oxygen storage amount O2SUM on the set target storage amount (step 180).

Further, when step 130 also results in no, it is then determined whether the oxygen storage amount O2SUM is within a range not less than the lower target storage amount A+α and not more than the upper target storage amount B−β (step 140). (Although they are described as the lower "target" storage amount A+α and upper "target" storage amount B−β herein for convenience' sake, there are also cases wherein these two values are not "target" values under circumstances via step 140.) When step 140 results in yes, since the oxygen storage amount O2SUM is in the range not less than the lower target storage amount A+α and not more than the upper target storage amount B−β, the A/F control based on the oxygen storage amount O2SUM is not carried out and the control of the flowchart shown in FIG. 2 is halted.

On the other hand, when step 140 results in no, the oxygen storage amount O2SUM is either in a range larger than the upper target storage amount B−β and not more than the upper threshold B or in a range smaller than the lower target storage amount A+α and not less than the lower threshold A. In this case, it is determined whether the control to converge the oxygen storage amount O2SUM on the target storage amount set at step 150 or at step 160 is under way after deviation of the oxygen storage amount O2SUM from the predetermined range (step 170). When step 170 results in yes, control is carried out to converge the oxygen storage amount O2SUM on the set target storage amount (step 180). When step 170 results in no, the A/F control based on the oxygen storage amount O2SUM is not carried out and the control of the flowchart shown in FIG. 2 is halted.

Through the above control, the oxygen storage amount O2SUM can vary within a certain fixed range (between the upper threshold B and the lower threshold A in the case of the present embodiment). Since the exhaust purifying catalyst possesses the property that the catalyst metal is activated more and the purification performance (oxidation/reduction performance and oxygen A/D performance) is kept higher when the catalyst is subjected to repetitions of the oxidation-reduction reactions and the oxygen A/D reactions to some extent than otherwise, as described previously, the catalyst metal can be activated and the exhaust purification performance can be kept high when the oxygen storage amount O2SUM is naturally varied within the predetermined range as described above.

In contrast to it, if the oxygen storage amount O2SUM is controlled so as to converge on one target value, the activation as described above will not be effected, so as to degrade the purification performance of the exhaust purifying catalyst. If the oxygen storage amount O2SUM is controlled so as to converge on one target value, there will arise such a concern that the control becomes easier to diverge, in the event of a mismatch between the control and the practical situation. In contrast to it, in the present embodiment the oxygen storage amount O2SUM is varied according to the development of situation as long as it is in the predetermined range. This can prevent failure in the control. In addition, since the oxygen storage amount O2SUM is varied within the predetermined range even according to the development of situation, the aforementioned activation is effected securely.

The present embodiment was configured to vary the oxygen storage amount O2SUM (to bring about the oxygen A/D reactions) within the predetermined range depending upon disturbance or the like, but it can also be contemplated that the oxygen storage amount O2SUM is forcibly varied within the predetermined range. In this configuration, however, the disturbance is superimposed on the forcible variation and there readily occur such situations that oxygen is used up from the exhaust purifying catalyst and that oxygen is occluded to the maximum capability thereof. With occurrence of these situations, the exhaust purification performance will be degraded as described previously.

If the forcibly varied range is decreased in fear of occurrence of such situations to the contrary, the variation range will be small, which is nothing but the control to converge the oxygen storage amount O2SUM on one target value. Taking this into consideration as well, it is preferable to perform the control only in the cases wherein the oxygen storage amount O2SUM becomes outside the predetermined range as in the present embodiment.

In the above-stated embodiment, when the oxygen storage amount O2SUM falls outside the predetermined range, the A/F control based on the oxygen storage amount O2SUM is carried out until the oxygen storage amount O2SUM becomes the target storage amount set inside the predetermined range. In this case, the A/F control based on the oxygen storage amount O2SUM is carried on even if inside the predetermined range before it reaches the target storage amount once. However, the control may also be modified so that, after the oxygen storage amount O2SUM falls outside the predetermined range, the A/F control based on the oxygen storage amount O2SUM is carried on before the oxygen storage amount O2SUM returns to within the predetermined range. This control is equivalent to a configuration wherein the values of $\alpha$ and $\beta$ in the aforementioned control are zero.

The present invention is not limited to each of the embodiments described above. For example, the oxygen storage amount estimating means estimated the oxygen storage amount O2SUM from the history of oxygen A/D amount O2AD calculated from the A/F of engine 1 and the above-stated embodiments used the output of the upstream A/F sensor 25 as the A/F for the calculation of oxygen A/D amount O2AD. It is, however, also possible to use the controlled A/F of the engine 1 as the A/F for the calculation of oxygen A/D amount. As another example, it is also possible to use the A/F obtained from the aforementioned fuel behavior model or combustion model.

In the above-stated embodiment, the typical A/F feedback correcting control was carried out in order to control the air-fuel ratio to the constant value while the oxygen storage amount O2SUM was between the upper threshold B and the lower threshold A. However, open loop control or the like may be also employed for controlling the air-fuel ratio to the constant value. Since this control also permits the oxygen storage amount O2SUM to be naturally varied within the predetermined range, the exhaust purification performance of the exhaust purifying catalyst can be kept high.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An air-fuel ratio control apparatus of an internal combustion engine comprising:

oxygen storage amount estimating means for estimating an oxygen storage amount of an exhaust purifying catalyst located on an exhaust path of the internal combustion engine, based on a history of an oxygen adsorption/desorption amount calculated from an air-fuel ratio of said internal combustion engine; and air-fuel ratio control means for controlling the air-fuel ratio, based on the oxygen storage amount estimated by said oxygen storage amount estimating means, wherein an upper threshold and a lower threshold are set for the oxygen storage amount estimated by said oxygen storage amount estimating means, and wherein when the oxygen storage amount estimated by said oxygen storage amount estimating means is between the upper threshold and the lower threshold, said air-fuel ratio control means controls the air-fuel ratio to a constant value without dependence on the oxygen storage amount; when the oxygen storage amount estimated is larger than the upper threshold, the air-fuel ratio control means controls the air-fuel ratio to a rich region; when the oxygen storage amount estimated is smaller than the lower threshold, the air-fuel ratio control means controls the air-fuel ratio to a lean region.

2. The air-fuel ratio control apparatus according to claim 1, wherein a target storage amount is further set between the upper threshold and the lower threshold, and wherein when the oxygen storage amount estimated by said oxygen storage amount estimating means is larger than the upper threshold, said air-fuel ratio control means controls the air-fuel ratio to the rich region so that the oxygen storage amount becomes the target storage amount; when the oxygen storage amount estimated is smaller than the lower threshold, the air-fuel ratio control means controls the air-fuel ratio to the lean region so that the oxygen storage amount becomes the target storage amount.

3. The air-fuel ratio control apparatus according to claim 1, wherein, in order to make the oxygen storage amount take only positive values, an oxygen storage amount with the exhaust purifying catalyst occluding no oxygen, is set as zero.

4. The air-fuel ratio control apparatus according to claim 1, wherein, in order to make the oxygen storage amount take positive and negative values, an oxygen storage amount with the exhaust purifying catalyst being in an arbitrary state, is set as zero.

5. The air-fuel ratio control apparatus according to claim 1, further comprising upstream exhaust air-fuel ratio detecting means for detecting an exhaust air-fuel ratio of exhaust gas flowing into the exhaust purifying catalyst, upstream of the exhaust purifying catalyst, wherein said oxygen storage amount estimating means calculates the oxygen adsorption/desorption amount, based on the exhaust air-fuel ratio detected by said upstream exhaust air-fuel ratio detecting means, and estimates the oxygen storage amount from a history of integration of the oxygen adsorption/desorption amount.

6. The air-fuel ratio control apparatus according to claim 1, wherein two target storage amounts are set as an upper target storage amount and a lower target storage amount between the upper threshold and the lower threshold, and wherein when the oxygen storage amount estimated by said oxygen storage amount estimating means is larger than the upper threshold, said air-fuel ratio control means controls the air-fuel ratio to the rich region so that the oxygen storage amount becomes the upper target storage amount; when the oxygen storage amount estimated is smaller than the lower threshold, the air-fuel ratio control means controls the air-fuel ratio to the lean region so that the oxygen storage amount becomes the lower target storage amount.

7. The air-fuel ratio control apparatus according to claim 6, wherein the upper threshold agrees with the upper target storage amount and the lower threshold agrees with the lower target storage amount.

8. The air-fuel ratio control apparatus according to claim 1, wherein the upper threshold and lower threshold are set below a maximum occludable oxygen amount of said exhaust purifying catalyst.

9. The air-fuel ratio control apparatus according to claim 8, wherein the upper threshold is set above a median value of the maximum occludable oxygen amount and the lower threshold is set below the median value of the maximum occludable oxygen amount.

10. The air-fuel ratio control apparatus according to claim 9, wherein an upper target value is set between the upper threshold and the median value of the maximum occludable oxygen amount and a lower target value is set between the lower threshold and the median value of the maximum occludable oxygen amount.

* * * * *